United States Patent
Gaspari (10) Patent No.: US 11,733,071 B2
(45) Date of Patent: Aug. 22, 2023

(54) METHOD AND SYSTEM FOR DETERMINING DEFORMATION IN A CABLE

(71) Applicant: NEXANS, Courbevoie (FR)

(72) Inventor: Roberto Gaspari, Oslo (NO)

(73) Assignee: NEXANS, Courbevoie (FR)

( * ) Notice: Subject to any disclaimer, the term of this patent is extended or adjusted under 35 U.S.C. 154(b) by 95 days.

(21) Appl. No.: 17/187,366

(22) Filed: Feb. 26, 2021

(65) Prior Publication Data
US 2021/0285801 A1  Sep. 16, 2021

(30) Foreign Application Priority Data

Mar. 11, 2020 (EP) .................................. 20305254

(51) Int. Cl.
*G01D 5/353* (2006.01)
*G01L 1/24* (2006.01)
*G01M 11/00* (2006.01)

(52) U.S. Cl.
CPC .......... *G01D 5/35364* (2013.01); *G01L 1/242* (2013.01); *G01M 11/319* (2013.01); *G01M 11/39* (2013.01)

(58) Field of Classification Search
CPC ............ G01D 5/35364; G01D 5/35358; G01L 1/242; G01M 11/319; G01M 11/39; G01M 11/086; D07B 2301/259; D07B 2301/5577; G01K 11/32; G01K 11/322; H01B 9/005; H02J 13/00017; H02J 13/00019
See application file for complete search history.

(56) References Cited

U.S. PATENT DOCUMENTS

| | | | | |
|---|---|---|---|---|
| 5,351,252 | A * | 9/1994 | Toyama | G01C 19/727 372/94 |
| 5,623,336 | A * | 4/1997 | Raab | G01J 3/4412 356/73.1 |
| 5,949,533 | A * | 9/1999 | Lee | G01D 5/35303 356/73.1 |

(Continued)

OTHER PUBLICATIONS

International Search Report dated Sep. 2, 2020.
(Continued)

*Primary Examiner* — Mohamed K Amara
(74) *Attorney, Agent, or Firm* — Sofer & Haroun, LLP (57) ABSTRACT

A method and system for determining deformation in a cable, where a sensing optical fiber arrangement is applied along the cable. The method includes injecting a forward pulse pump signal in the optical fiber in a forward direction of the optical fiber and injecting a reverse probe signal in the optical fiber in a reverse direction of the optical fiber. A stimulated Brillouin backscattering is measured and, based on the Brillouin backscattering measurement, information is provided about a deformation of the cable. The forward pulse pump signal is provided as a sum of a stationary signal component and an interrogation pulse component, the stationary signal component has an energy below a Brillouin activation level and the interrogation pulse signal component has an energy which results in that the sum of the stationary signal component and the interrogation pulse signal component exceeds the Brillouin activation level.

19 Claims, 9 Drawing Sheets

(56) References Cited

U.S. PATENT DOCUMENTS

| | | | | |
|---|---|---|---|---|
| 7,272,160 B1* | 9/2007 | Geng | ............... | H01S 3/302 |
| | | | | 372/29.011 |
| 8,103,175 B1* | 1/2012 | Kowalczyk | ...... | H04B 10/25759 |
| | | | | 398/115 |
| 8,184,980 B2* | 5/2012 | Sarchi | ............ | H02J 13/00019 |
| | | | | 356/73.1 |
| 8,953,915 B2* | 2/2015 | Sarchi | ............... | H01B 7/32 |
| | | | | 385/101 |
| 2002/0048300 A1* | 4/2002 | Tsukiji | ............ | H01S 5/227 |
| | | | | 372/50.11 |
| 2002/0093724 A1* | 7/2002 | Krummrich | ......... | H04B 10/296 |
| | | | | 359/334 |
| 2002/0149841 A1* | 10/2002 | Ohtani | ............ | H04B 10/2916 |
| | | | | 359/341.1 |
| 2003/0128946 A1* | 7/2003 | Glingener | ............ | G01M 11/319 |
| | | | | 356/73.1 |
| 2011/0090496 A1* | 4/2011 | Samson | ............ | G01D 5/35364 |
| | | | | 356/301 |
| 2013/0308682 A1* | 11/2013 | Tur | ............ | G01D 5/35364 |
| | | | | 374/161 |
| 2014/0152982 A1 | 6/2014 | Gosteli et al. | | |
| 2015/0308923 A1* | 10/2015 | Chin | ............ | G01M 11/085 |
| | | | | 356/73.1 |
| 2015/0311662 A1* | 10/2015 | Vahala | ............ | H03B 17/00 |
| | | | | 250/552 |
| 2017/0108358 A1* | 4/2017 | Bastianini | ......... | G01D 5/35303 |
| 2019/0063963 A1* | 2/2019 | Lanticq | ............ | G01D 5/35303 |
| 2021/0318147 A1* | 10/2021 | Matsuura | ............ | G01M 11/33 |

OTHER PUBLICATIONS

Zeni Luigi et al: "High-Pass Filtering for Accurate Reconstruction of the Brillouin Frequency Shift Profile From Brillouin Optical Frequency Domain Analysis Data" IEEE Sensors Journal, IEEE Service Center, New York, NY, US; Jan. 1, 2018.

\* cited by examiner

METHOD AND SYSTEM FOR DETERMINING DEFORMATION IN A CABLE

RELATED APPLICATION

This application claims the benefit of European Patent Application No. EP 20 305 254.3, filed on Mar. 11, 2020, the entirety of which is incorporated by reference.

TECHNICAL FIELD

The invention relates to measurements using a distributed optical fiber sensor, and in particular to a method and a system for determining deformation in a cable, wherein a sensing optical fiber is applied along the cable. The invention also relates to a method and a system for deployment of a subsea power cable to a seafloor.

BACKGROUND

During deployment of installation of a cable, for instance the deployment of a power cable at a seafloor, it is desirable to monitor the deformation of the cable, in particular deformation that occurs at a touch point, i.e., a point where the cable touches a point or area of the seafloor.

Methods for determining deformation in a cable, using a sensing optical fiber along the cable, are known in the background art.

EP-3 161 440 relates to a method for determining deformation in a structure, e.g. a cable, using a sensing optical fiber along the structure. A pulse width of a pulse pump signal is adjusted to achieve a predefined spatial resolution for the detection of deformation. A probe signal is provided in the opposite direction of the fiber, resulting in stimulated Brillouin backscattering in a predefined area of interest.

SUMMARY OF THE INVENTION

There is a need for a method for determining deformation in a cable, a method for deployment of a subsea power cable to a seafloor, a system for determining deformation in a cable, and a system for deployment of a subsea power cable to a sea bottom, which overcome disadvantages of the background art.

To this end, there has been disclosed a method for determining deformation in a cable, a method for deployment of a subsea power cable to a seafloor, a system for determining deformation in a cable, and a system for deployment of a subsea power cable to a sea bottom, as set forth in the appended claims.

DETAILED DESCRIPTION

Figure 1:
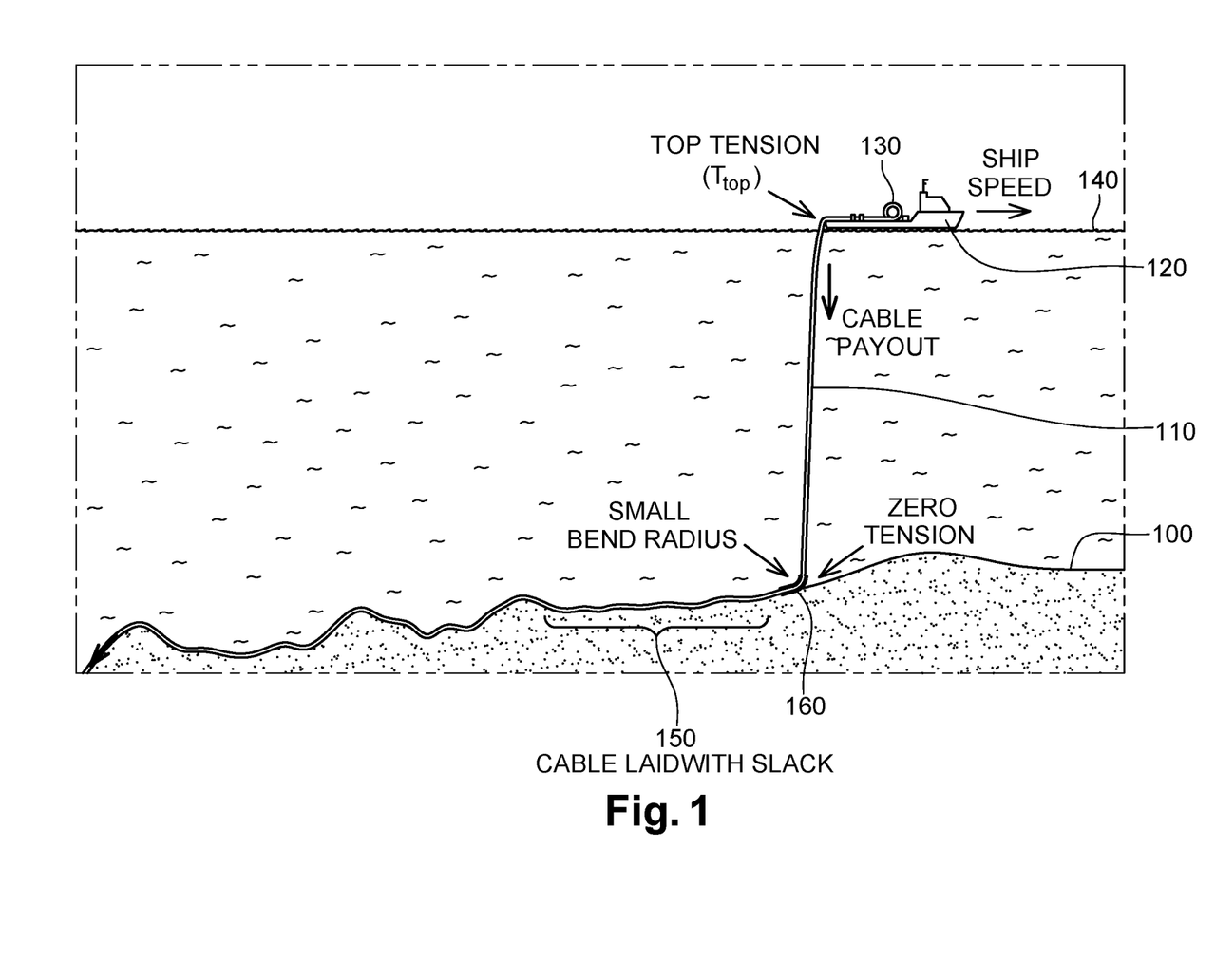
FIG. 1 is a schematic view illustrating aspects of the deployment of a power cable on a seafloor.

FIG. 1 is a schematic view illustrating aspects of the deployment of a power cable 110 on a seafloor 100.

The power cable may, e.g., serve the purpose of supplying electrical energy to or from a subsea device located at the seafloor 100. The power cable may include electric power lines, optionally also electric and/or optical communication lines, hydraulic lines, etc. In an aspect, the power cable may be or be included in a subsea umbilical.

The power cable 110 is deployed by means of a cable-laying vessel 120 floating on a sea surface 140, from a cable reel 130 positioned on the deck of the vessel 120.

As illustrated in FIG. 1, the seafloor 100 generally has an irregular surface, and the power cable is laid with a slack on the seafloor 100. Hence, the cable will generally follow irregularities, in particular vertical irregularities, on the seafloor 100.

Such a deployment of the power cable may have the disadvantage that it may result in a bend radius less than a minimum bend radius (MBR) recommended by a manufacturer of the power cable. This could lead to excessive bending of the cable. Kink and damage of the power cable at the touchdown points or areas may result. Such a location along the cable with a small bend radius and thus excessive bending of the cable has been shown by example at 160. In the example area illustrated at 150, the cable is laid with a slack, resulting in that the cable closely follows the irregular surface of the seafloor, at least within the area 150.

To avoid the drawback of excessive bending, the power cable may be deployed with less slack on the seafloor. In other words, the power cable may be installed with some residual tension to avoid a bend radius smaller than the minimum bend radius (MBR) recommended by the manufacturer.

Figure 2:
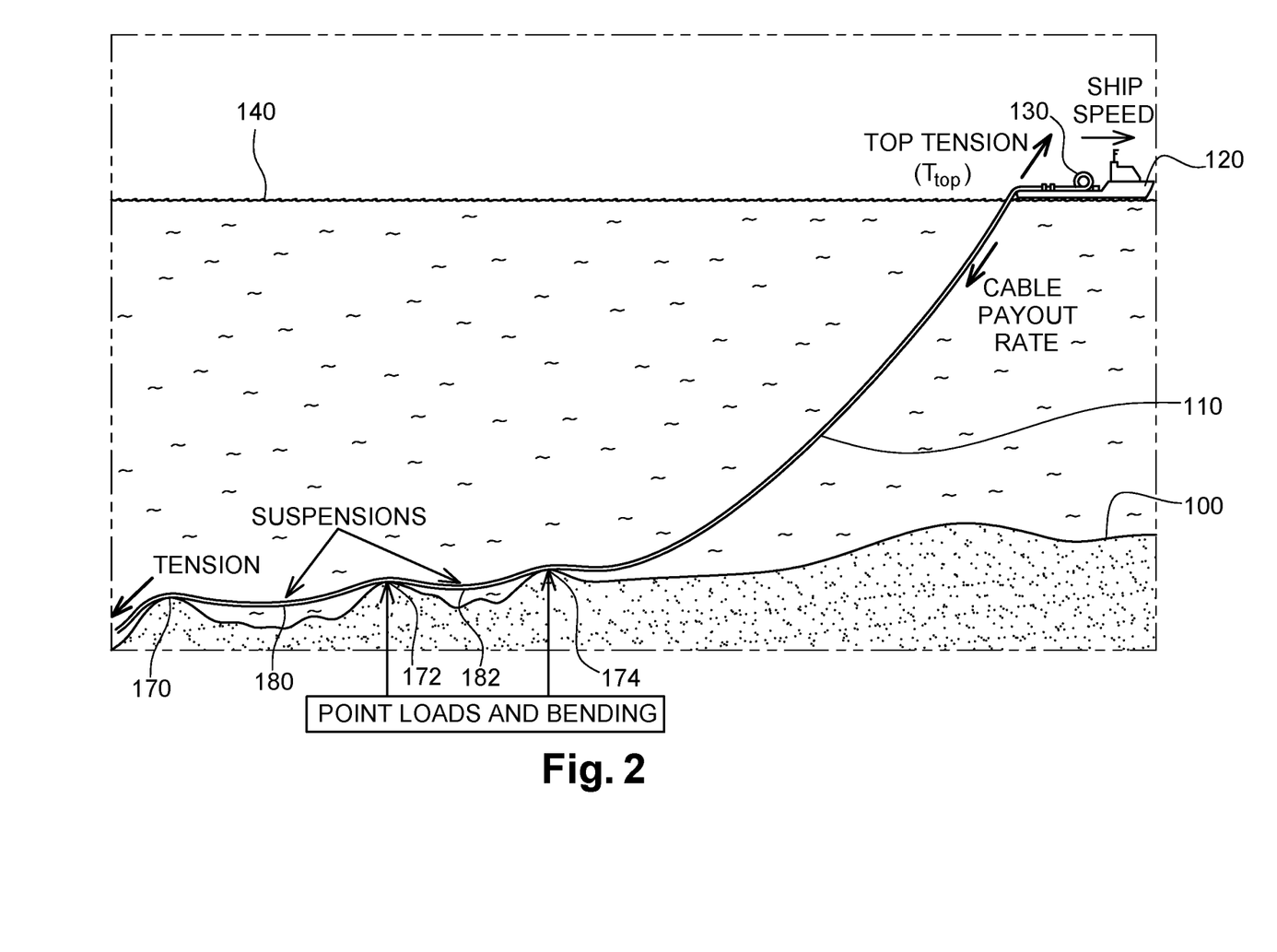
FIG. 2 is a schematic view illustrating further aspects of the deployment of a power cable on a seafloor.

FIG. 2 is a schematic view illustrating further aspects of the deployment of a power cable on a seafloor.

Corresponding to the situation shown in FIG. 1, the power cable 110 is deployed by means of a cable-laying vessel 120 floating on a sea surface 140, from a cable reel 130 positioned on the deck of the vessel 120.

The seafloor 100 illustrated in FIG. 2 has the same irregular surface as in FIG. 1. However, in FIG. 2, the power cable 110 is deployed with less slack on the seafloor 100, compared to the situation illustrated in FIG. 1. This less slack leads to seafloor contact points 170, 172, 174 and suspensions 180, 182.

Due to the fact that conventional installers of power cables do not have the means to accurately estimate the cable tension on the seafloor, they operate with very high safety factors. Consequently, power cables are usually installed with tensions that are much higher than the required values. Cable suspensions occur more often than desired as a result. As shown in FIG. 2, at these seafloor contact points, large reaction forces and small bend radii are common, thereby reducing the life expectancy of the cable due to increased wearing and chafing.

Figure 3:
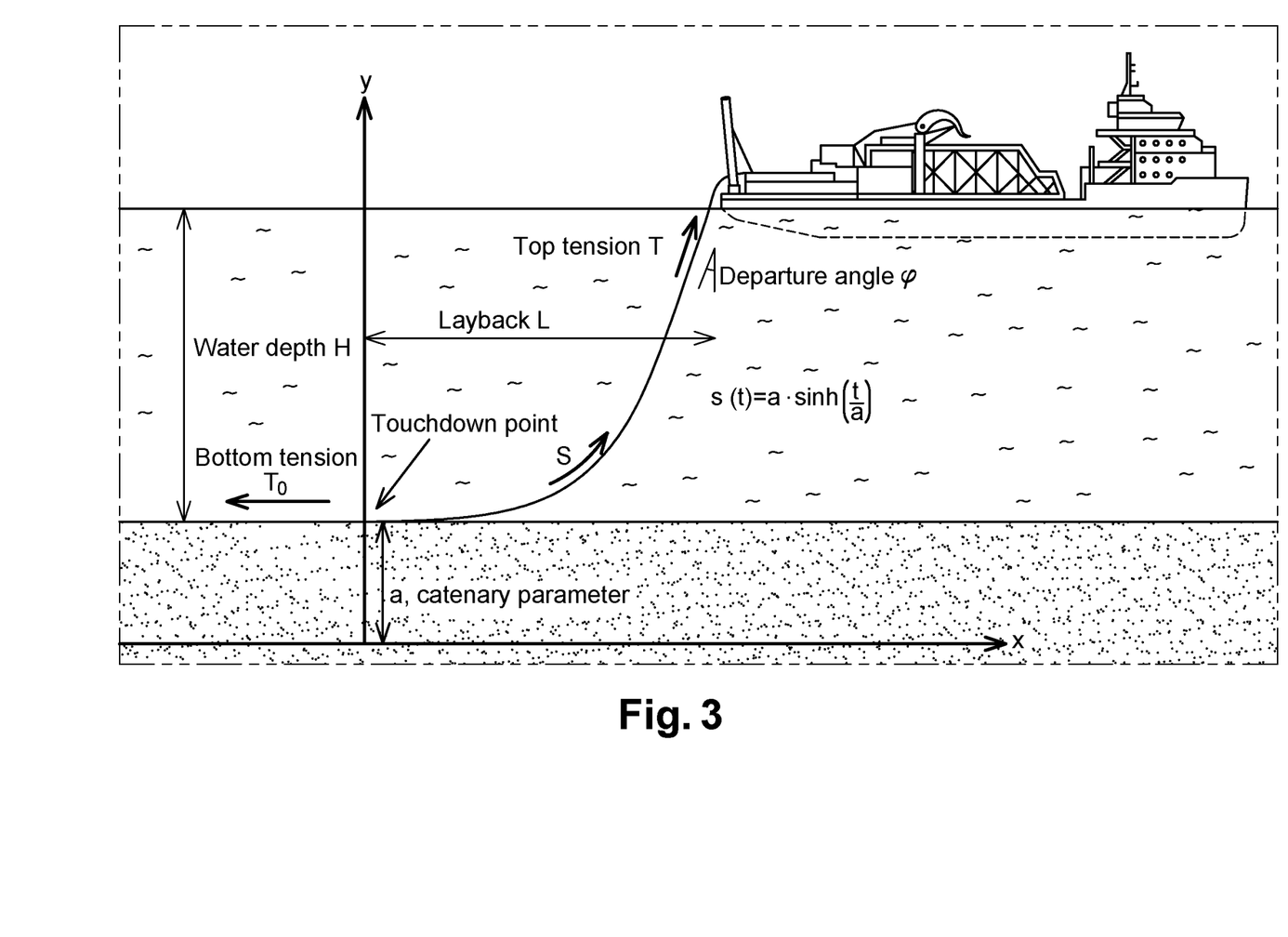
FIG. 3 is a schematic view illustrating still further aspects of the deployment of a power cable on a seafloor.

FIG. 3 is a schematic view illustrating still further aspects of the deployment of a power cable on a seafloor, in particular aspects of catenary during laying.

To maximize the life expectancy of the cable, the power cable installer must accurately lay the cable with low values of bottom tension to avoid cable suspensions, but at the same time maintain a small amount of tension at the touchdown to maintain bend radii above the MBR. Traditional methods often result in large cable suspensions which reduce the lifespan of the cable. The key to minimizing suspensions is to accurately control the cable tensions at touchdown. However, due to the lack of measurement capabilities, tension at touchdown is calculated from measured top conditions of the cable. The tension of the cable at the seafloor can, very closely, be estimated by the simple relationship:

$$T_{Top} = T_{Bottom} + W \cdot H, \text{ where:}$$

$T_{Top}$ is the top cable tension (measured at the vessel),
$T_{Bottom}$ is the cable tension at a touchdown point,
W is the cable wet weight per unit length
H is the water depth at the touchdown.

This simple relationship is useful for calculating cable bottom tension only when installing the cable in relatively shallow waters and on a flat seafloor. In mid and deep waters, the weight of the suspended cable in the water column (WH) tends to be considerably larger than the desired value of bottom tension, and in most cases the noise in the measurements of top tension (due to cable and ship dynamics) is equal to or larger than the low values of $T_{Bottom}$ the installer wants to maintain. Therefore, simply measuring $T_{Top}$ does not provide a good method to estimate the values of bottom tension.

In addition, not having an accurate model of the cable dynamics in the water column can introduce large errors in the exact location of the cable touchdown, so while laying up-slopes or down-slopes, these errors can quickly affect the true touchdown depth, H, and consequently the estimated values of $T_{Bottom}$. A typical example is when laying cable down the slope. If the operator wants to decrease the value of bottom tension, the logical step is to pay out more cable at the surface. However, in this case the cable touchdown becomes deeper and the $T_{Top}$ increases. As the tension increases, the operator thinks he should pay out more cable to decrease the tension, but this only makes the situation worse.

Another common practice of estimating bottom tension is by using the cable angle at the sheave. In shallow waters, the cable angle may be more sensitive to the changes in cable bottom tension so this method works. However, in deep waters, the cable enters the water almost vertically and is very insensitive to changes in cable bottom tension, therefore, the value of cable angle does not provide accurate feedback on cable tension.

Figure 4:
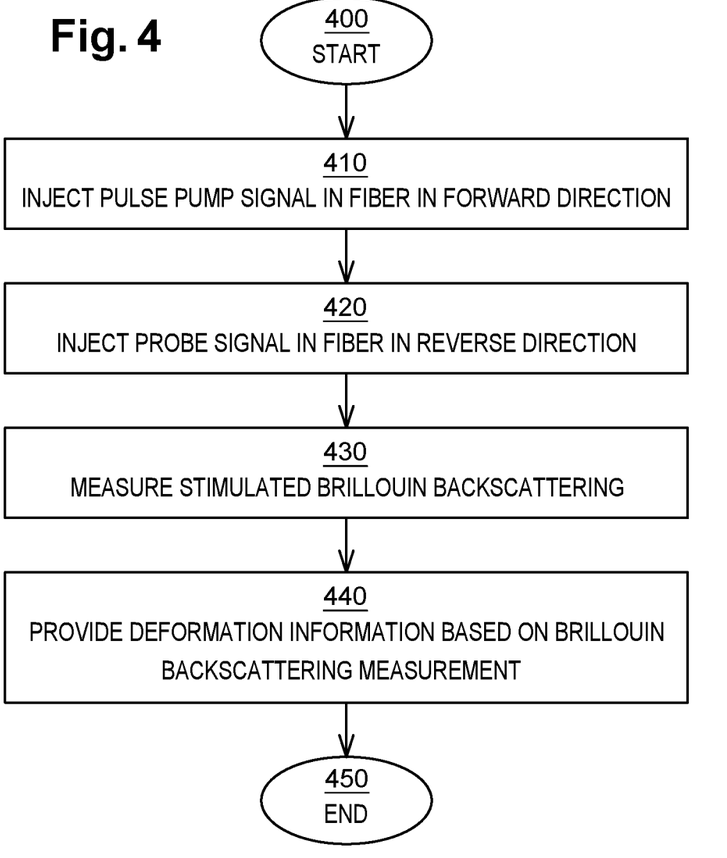
FIG. 4 is a schematic flow chart illustrating a method for determining deformation in a cable.

FIG. 4 is a schematic flow chart illustrating a method for determining deformation in a cable, according to the invention. The method illustrated in FIG. 4 is a method for determining deformation in a cable 110, wherein a sensing optical fiber is applied along the cable 110. In an aspect, the optical fiber may be embedded in the cable 110.

In a typical application, the cable 110 is a subsea power cable to be deployed on a seafloor 100, although other possible applications also exist. Both in the case of deploying a subsea power cable and in the case of other applications, there may be a need for monitoring the deformation of the cable, and to locate the deformations along the cable 110, in particular during the deployment/installation stage.

The method is initiated at the initiating step 400.

First, in the forward pulse pump signal injection step 410, a forward pulse pump signal is injected in the optical fiber in a forward direction of the optical fiber. The forward pulse pump signal injection step 410 may e.g. be performed by means of a stimulated Brillouin optical time-domain reflectometer (OTDR), which is an optoelectronic instrument that may be used to characterize an optical fibre.

Next, in the reverse probe signal injection step 420, a reverse probe signal is injected in the optical fiber in a reverse direction of the optical fiber. It should be understood that the term "injected" may refer to a signal introduced into a fiber at a far end, as well as referring to a signal reflected or redirected from a far end to propagate in the reverse direction. The reverse probe signal injection step 420 may also e.g. be performed by means of a stimulated Brillouin optical time-domain reflectometer (OTDR).

The injection steps 410 and 420 may involve continuous Raman pumping.

Next, in the measurement step 430, a stimulated Brillouin backscattering is measured. The measurement step 430 may also e.g. be performed by means of a stimulated Brillouin optical time-domain reflectometer (OTDR).

Stimulated Brillouin backscattering is a phenomenon known from background art, in which spontaneous light scattering occurs as a result of acoustic waves Next, in the deformation provision step 440, information about a deformation of the cable 110 is provided, based on the Brillouin backscattering measurement.

After the provision of information about a deformation of the cable 110, the method may be repeated from the injection step 410. Otherwise, the method may be terminated at the terminating step 450.

According to the disclosed method, in the forward pulse pump signal injection step 410, the forward pulse pump signal is provided as a sum of a stationary signal component and an interrogation pulse component.

In an advantageous aspect, the forward pulse pump signal injected in step 410 has a stationary signal component, and the stationary signal component has an energy or power which is below a Brillouin activation level. The stationary signal component may have an energy or power slightly below the Brillouin activation level or threshold. For instance, the stationary signal component may have a power between 1% and 20% below the Brillouin activation power level, or the stationary signal component may have a power between 2% and 10% below the Brillouin activation power level.

The forward pulse pump signal and the reverse probe signal are synchronized such that they meet and intermix only over the touch point length to be monitored. In this way, the major part of the fibre is not optically active. Therefore, little or no background noise is generated. At least, less background noise is generated compared to solutions of the background art.

The interrogated length is automatically adjusted to the laying depth and to the distance, along the cable, from the interrogating instrument onboard the laying ship.

Additionally, as needed or as a different measurement mode for slow processes, the interrogation length could be moved by sweeping the overlap length over the entire length of the cable itself.

Also, in this advantageous aspect, the forward pulse pump signal injected in step 410 has an interrogation pulse signal component that has an energy which results in that the sum of the stationary signal component and the interrogation pulse signal component exceeds the Brillouin activation level.

The information about the deformation of the cable 110, provided in the deformation provision step 440, advantageously includes information about a localization along the cable of the deformation of the cable 110.

In an advantageous aspect, the method further comprises a temperature provision step, which includes, based on the Brillouin backscattering measurement provided in the measurement step 430, to provide information about temperatures along the cable.

Advantageously, the cable 110 is a subsea power cable.

In any of the above aspects and features, the method for determining deformation in a cable 110 may be performed during a deployment of the cable from a vessel 120 floating on a sea surface 140 to a seafloor 100.

The disclosed method may provide information about the local deformation (and temperature) if the energy level is high enough to generate a Brillouin backscatter signal.

The invention also relates to a method for deployment of a subsea power cable 110 to a seafloor 100 from a cable reel 130 positioned on the deck of a cable-laying vessel 120 floating on a sea surface 140, the method comprising determining deformation in the subsea power cable 110 by means of a method for determining deformation in a cable as has been disclosed above with reference to FIG. 4.

Figure 5:
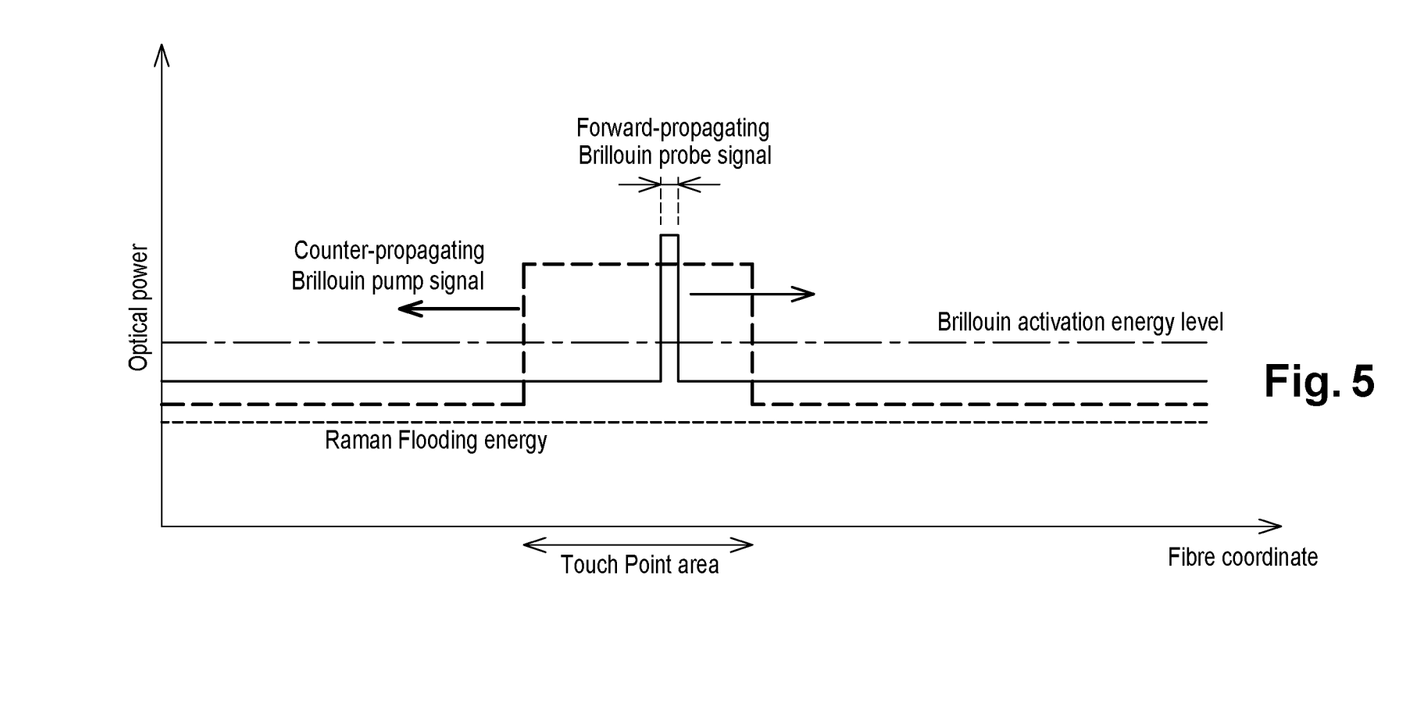
FIG. 5 is a schematic view illustrating optical power in an optical fiber as a function of a position along the optical fiber.

FIG. 5 is a schematic view illustrating optical power in an optical fiber as a function of a position along the optical fiber.

As shown in FIG. 5, the stationary signal component, denoted "Raman Flooding energy", has an energy below a Brillouin activation energy level, and the interrogation pulse signal component has an energy which results in that the sum of the stationary signal component and the interrogation pulse signal component exceeds the Brillouin activation energy level.

The methods and systems according to the invention have at least the following advantages over the background art:

Since the fibre is generating a Brillouin signal only over the "activated" length the background noise is minimized. This leads to an improved signal to noise ratio. The disclosed methods and systems allow for longer lengths of fibre to be used, compared to solutions of the background art.

The disclosed methods and systems makes it possible to monitor cable and umbilical deformation and bending radius at a touch point during deployment. By means of the disclosed methods and systems, continuous control and verification of appropriate cable handling and laying operation may be achieved.

Various embodiments of the instrumentation and physical arrangement of the fiber elements over a cable length 200 is illustrated in FIGS. 6a, 6b, 6c and 6d.

Typically, cable 200 comprises several cable segments (201, 202 and 203) that are joined by suitable energy joints 211 and 212, either manufactured and installed in the factory (factory joints) or during the cable installation (field joints).

Figure 6A:
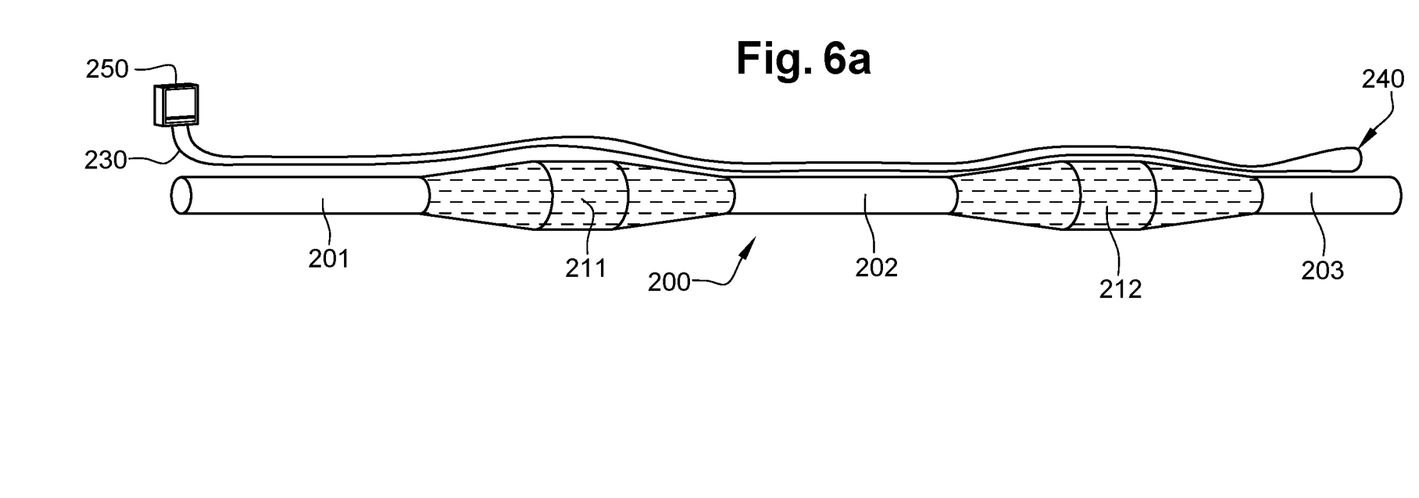
FIG. 6a is a side view of an embodiment of the invention where an interrogating instrument is connected to a continuous optical fiber arranged as a loop along the cable to be monitored.

The first example of FIG. 6a illustrates a continuous optical fiber 230 arranged as a returning loop with a far end 240. Both ends of continuous optical fiber 230 are connected to an interrogation instrument 250. A suitable length of optical fiber 230 is installed along, in contact or within the cable segments (201, 202 and 203) as well as over the joints. The outbound length 230 of said optical fiber may either be deployed covering the full length of the cable to be monitored or may only be applied over a reduced length extending to a specific area to be monitored.

The installation of said fiber 230 can be either made during the cable production or during the laying of the cable itself as a separate element to be suitably attached to the cable.

The geometry of the optical fiber 230 with reference to the cable 200 itself could also vary: the fiber could be longitudinally laid in/over the cable to be monitored or installed in helical configuration, both in closed continuous or-quasi-continuous helix or with a bidirectional helix with oscillations (S/Z helix) and inversions of the laying direction.

Similarly a different geometry could be selected, if needed or desired, over different cable segments 201, 202 and 203 or joints 211 and 212.

At the far end 240, fiber 230 is looped back to return along the cable to the interrogation instrumentation, which is arranged to introduce the forward pulse pump signal into one side of the loop, and the reverse probe signal in the opposite side of the loop.

Figure 6B:
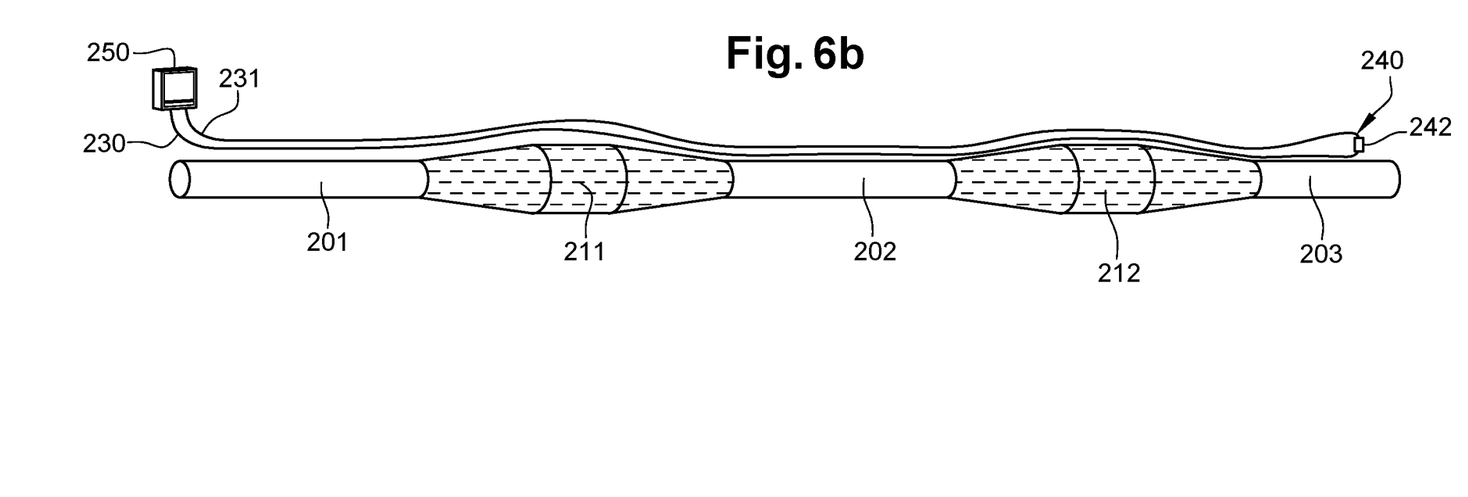
FIG. 6b is a side view of an embodiment similar to that of FIG. 6a, but where the fiber loop comprises two elongated fiber segments joined together at an end distant from the interrogating instrument to form the loop.

In FIG. 6b, two segments of optical fiber 230 and 231 are connected at the far end 240 by a splice 242 to form the loop. The segments are laid along the cable 200 to be monitored. As described above, the segments 230 and 231 may be integrated into the cable during manufacture of the cable or installed on site or during laying of the cable. Several jointing methods could be utilized: e.g. fiber splicing 242, connectors and mechanical joints. The near ends of optical fiber segments 230 and 231 are optically connected to the interrogation instrument 250 to allow the required measurement.

Figure 6C:
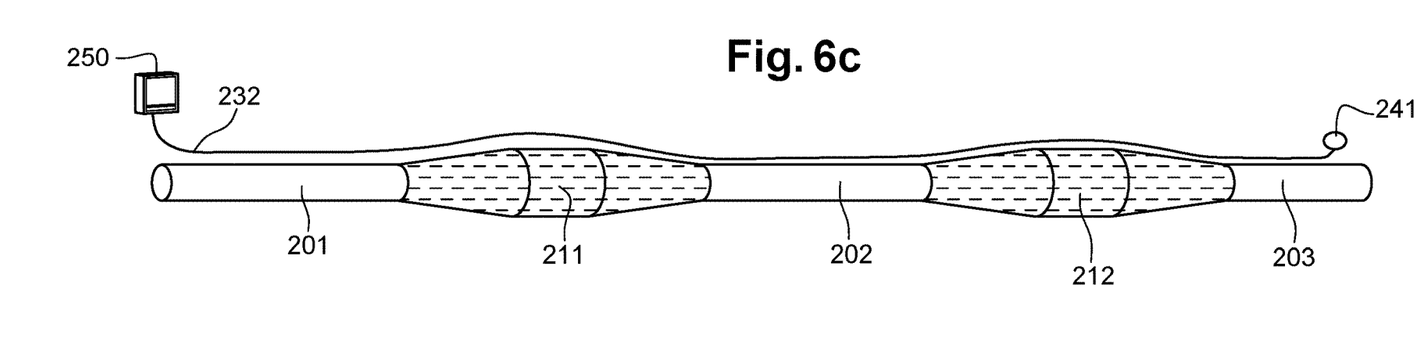
FIG. 6c is a side view of an embodiment where the interrogating instrument is connected to a single optical fiber having an optical reflector at its far end to return the signals to the instrumentation.

FIG. 6c illustrates an embodiment of the invention where a single optical fiber 232, rather than a loop, is arranged over the cable segments 201, 202 and 203 and joint 211 and 212. The single optical fiber 232 is utilized to propagate both the forward pulse pump signal and the reverse probe signal, with the reverse probe signal being reflected or redirected in the reverse direction by a circulating device 241. Both signal are introduced at a near end, with the timing of the signals being synchronized such that the reflected or redirected reverse probe signal meets the forward pulse pump signal at the desired location.

Figure 7A:
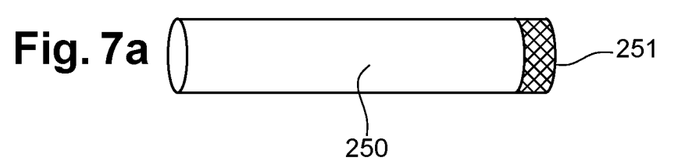
FIGS. 7a and 7b illustrate possible ways to realize an optical reflection or redirection of a signal at the far end of the fiber, with FIG. 7a illustrating a reflector and FIG. 7b illustrating an end with a loop and signal splitter.
Figure 7B:
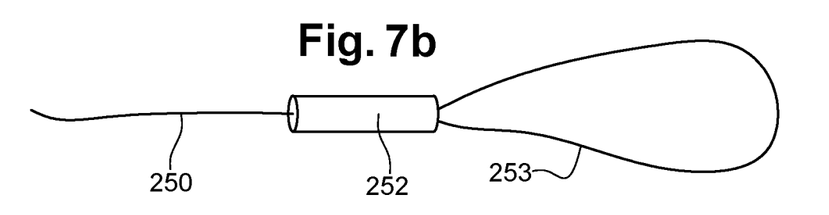

FIGS. 7a and 7b illustrate alternate arrangements for circulating device 241. FIG. 7a illustrates one embodiment in the form of a modification of an end 250 of the optical fiber to be reflective. Such end is precisely cut at 90 degrees from the cable axis and polished as a mirror surface to smooth irregularities and to obtain a preferably flat surface with an angle from the axis of the optical fiber of preferably 85° to 95°. Such polished surface permits obtaining a suitable Fresnel reflection. In a preferred embodiment an additional layer 251 of high reflective material, e.g. gold or silver, is applied or glued to the fiber polished end to realize the desired reflection.

FIG. 7b illustrates another possible embodiment of circulating device 241, realized by means of a small fiber loop 253 connected to an optical power splitter 252, where the each of the two optical signals is split. Therefore in loop 253 four different signals will be present: two parts (split by 252) of the forward pulse pump signal, counterpropagating in 253, and two parts (again split by 252) of the reverse probe signal, counterpropagating again in 253. All such counter-propagating signals components are then reunited in 252 to then return to the fiber end 250.

The use of such closed loop and the unicity of the optical path length assures that the two counterpropagating parts of each signal will match in phase and furthermore no power will be lost since the signal and power will be reconstructed in the return path.

The two abovementioned geometries present different advantages: with a loop as in FIGS. 6a and 6b there is no mixing of the pulse pump and probe signals, however this embodiment requires two dedicated fibers to allow the measurement.

With a "single fiber" solution the method utilizes the same fiber for both signals, but particular care has to be taken to minimize the pump and probe signal mixing far from the section of the cable to be monitored.

Figure 8:
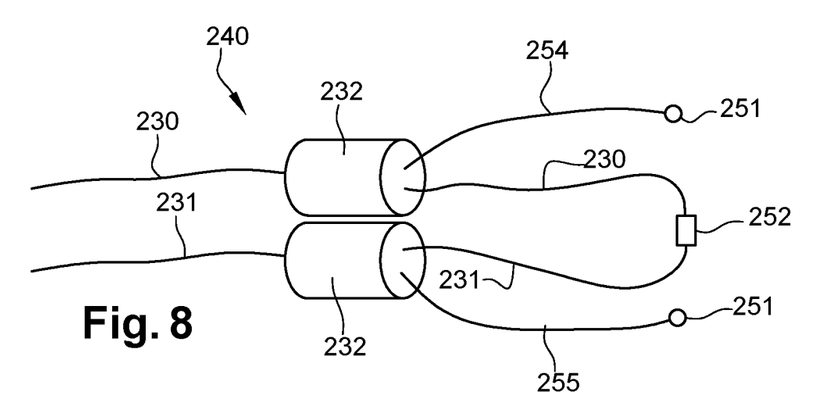
FIG. 8 illustrates an embodiment of a hybrid arrangement where a loop arrangement similar to FIGS. 6a and 6b can be switched to a single fiber/reflective arrangement similar to FIG. 6c by a splitter in the event one side of the loop becomes damaged.

FIG. 8 illustrates an embodiment that involves switching from a loop geometry to a single fiber geometry, e.g. in case one (or more) parts of optical fibers 230 (or 231) become damaged during the laying operation. At an end of a loop formed by fibers 230/231 are arranged splitters 232, connected to fiber segments 254 and 255. Segments 254 and 255 have circulating devices 251 at their respective ends. In this embodiment, the arrangement could be switched manually, or in a preferred method automatically, from the loop geometry to the single fiber geometry.

The embodiment illustrated in FIG. 8 provides redundancy, in order to improve reliability by switching, in the preferred embodiment in automatic fashion, in case a fiber break is detected. In this embodiment, a fiber break detection routine is provided, for example in the interrogation instrument 250. Should a fiber break be detected the system will activate the optical switches 232 to switch the optical path, from an initial configuration where the signals travel via 230 and 231 (and the optical splice 252), to, and back from, fiber 254 (terminated with the circulating device 251) in case of failure of fiber 231, or to, and back from, fiber 255, also terminated with a circulating device 251, in case of failure of fiber 230.

Figure 9:
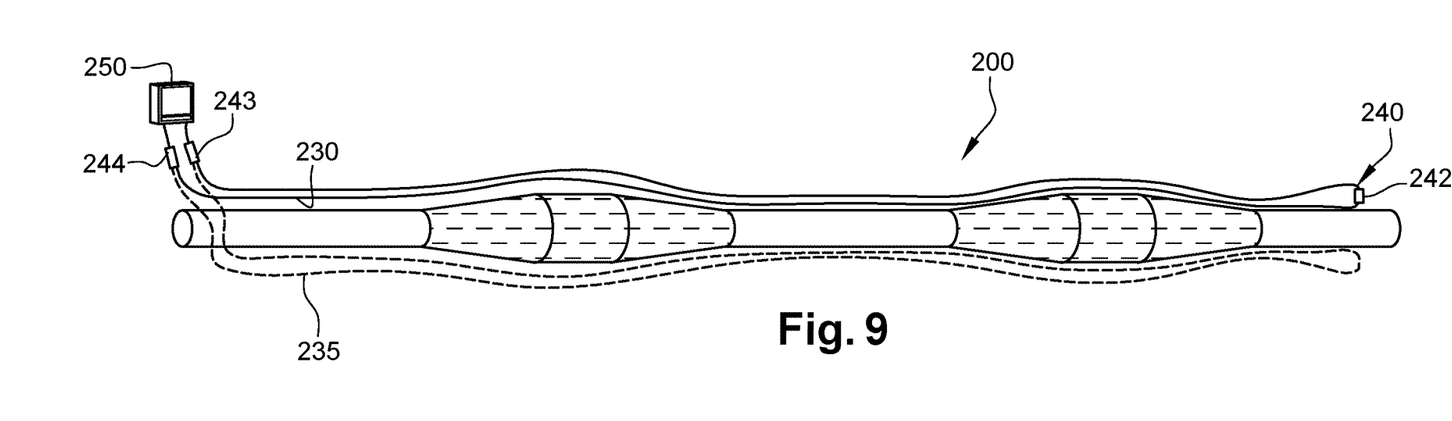
FIG. 9 is a schematic of an arrangement with redundant loops.

Redundancy may also be provided by the embodiment shown in FIG. 9, where a spare loop of fiber 235 is installed along the cable 200.

In case a break in the main loop is detected optical switches 243 and 244 are activated to allow use of the spare fiber loop 235. It should be understood that the switches may be part of instrumentation 250.

Figure 6D:
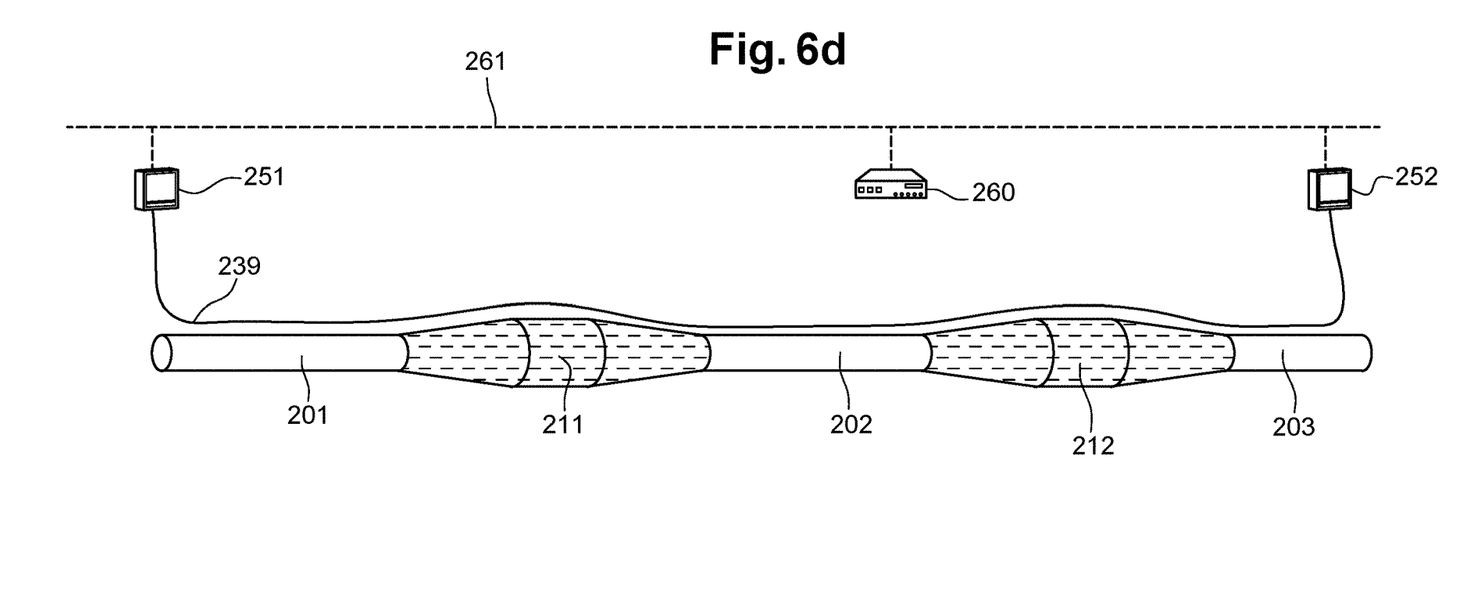
FIG. 6d is a schematic of an embodiment where two interrogating instruments are located at the opposite ends of a single optical fiber, together with a synchronizing instrument to synchronize the signals from the instruments.

FIG. 6d illustrates an embodiment of the invention employing a single optical fiber 239 arranged along the cable to be monitored, with monitoring instrumentation 251 and 252 installed respectively at each of two ends. FIG. 6d shows a first interrogation instrument 251 connected to one optical fiber length end to generate the forward pulse pump signal and a second instrument 252 to generate the reverse pump signal connected to another end. In order to achieve pulse synchronization such that the signals meet at the area to be monitored a suitable synchronization signal could be generated in either/both instruments 251 or 252 and transmitted over a synchronization connection 261. Alternatively a dedicated synchronization instrument 260 will generate desired the synchronization signal.

The invention claimed is:

1. A method for determining deformation in a cable, wherein an optical fiber arrangement includes an optical fiber for sensing, and is applied along the cable, the method comprising—injecting a forward pulse pump signal in the optical fiber arrangement in a forward direction of the optical fiber; —injecting a reverse probe signal in the optical fiber arrangement in a reverse direction of the optical fiber; —measuring a stimulated Brillouin backscattering; —based on the Brillouin backscattering measurement, providing information about a deformation of the cable; wherein the forward pulse pump signal is provided as a sum of a stationary signal component and an interrogation pulse component, and wherein the stationary signal component has an energy below a Brillouin activation level and the interrogation pulse signal component has an energy which results in that the sum of the stationary signal component and the interrogation pulse signal component exceeds the Brillouin activation level.

2. The method for determining deformation in a cable according to claim 1, wherein the information about the deformation of the cable includes information about a localization along the cable of the deformation of the cable.

3. The method for determining deformation in a cable according to claim 2, further comprising, based on the Brillouin backscattering measurement, providing information about temperatures along the cable.

4. The method for determining deformation in a cable according to claim 1, wherein the cable is a subsea power cable.

5. The method for determining deformation in a cable according to claim 1, performed during a deployment of the cable from a vessel floating on a sea surface to a seafloor.

6. The method for determining deformation in a cable according to claim 1, wherein the optical fiber arrangement comprises a length of optical fiber arranged as a loop, the loop reversing direction at a far end, with two proximate ends of the length of optical fiber connected to an interrogation instrument arranged to inject the pulse pump signal and the probe signal into respective ends of the optical fiber.

7. The method for determining deformation in a cable according to claim 6, further comprising one or more splitters at distal end of the optical fiber, the one or more splitters connected to a segment of optical fiber having a circulating device arranged at its distal end.

8. The method for determining deformation in a cable according to claim 1, wherein the optical fiber arrangement comprises a single length of optical fiber, with a proximate end connected to an interrogation instrument arranged to introduce both the pulse pump signal and the probe signal into the same end of the optical fiber, the optical fiber having a distal end comprising a circulating device arranged to reflect or redirect the probe signal in the reverse direction.

9. The method for determining deformation in a cable according to claim 8, wherein the circulating device comprises a reflective surface.

10. The method for determining deformation in a cable according to claim 8, wherein the circulating device comprises a loop and a splitter device.

11. A system for deployment of a subsea power cable to a sea bottom from a cable reel positioned on a deck of a cable-laying vessel floating on a sea surface, wherein a sensing optical fiber arrangement is applied along the subsea power cable, and wherein the system for deployment of the subsea power cable comprises a system for determining deformation in the cable as set forth in claim 8.

12. The method for determining deformation in a cable according to claim 1, wherein the optical fiber arrangement comprises a single length of optical fiber, with an interrogation instrument arranged at each end, one interrogation instrument arranged to inject the pulse pump signal and the other interrogation instrument arranged to inject the probe signal.

13. A method for deployment of a subsea power cable to a seafloor from a cable reel positioned on a deck of a cable-laying vessel floating on a sea surface, wherein a sensing optical fiber is applied along the subsea power cable, the method comprising determining deformation in the subsea power cable by means of a method as set forth in claim 1.

14. A system for determining deformation in a cable, wherein an optical fiber arrangement includes an optical fiber for sensing, and is applied along the cable, the system comprising: —a pulse pump signal injecting device, injecting a pulse pump signal in the optical fiber in a forward direction of the optical fiber; —a probe signal injecting device, injecting a probe signal in the optical fiber in a reverse direction of the optical fiber; —a measuring device, measuring a stimulated Brillouin backscattering; —a computing device, configured to provide information about a deformation of the cable based on the Brillouin backscattering measurement, wherein the pulse pump signal injecting device is configured to provide the forward pulse pump signal as a sum of a stationary signal component and an interrogation pulse component, and wherein the stationary signal component has an energy below a Brillouin activation level and the interrogation pulse signal component has an energy which results in that the sum of the stationary signal component and the interrogation pulse signal component exceeds the Brillouin activation level.

15. The system for determining deformation in a cable according to claim 14, wherein the information about the deformation of the cable includes information about a localization of the deformation of the cable.

16. The system for determining deformation in a cable according to claim 14, wherein the computing device is further configured to, based on the Brillouin backscattering measurement, providing information about temperatures along the cable.

17. The system for determining deformation in a cable according to claim 14, wherein the cable is a subsea power cable.

18. The system for determining deformation in a cable according to claim 14, configured to operate during a deployment of the cable from a floating vessel to a seafloor.

19. The system for determining deformation in a cable according to claim 14, wherein the optical fiber arrangement is arranged as a loop, the loop reversing direction at a far end, with two proximate ends of the length of optical fiber connected to an interrogation instrument arranged to inject the pulse pump signal and the probe signal into respective ends of the optical fiber.

\* \* \* \* \*